United States Patent [19]

Pernicano

[11] Patent Number: 4,766,032

[45] Date of Patent: Aug. 23, 1988

[54] REFLECTIVE TRANSFER SHEETING AND METHOD OF MAKING THE SAME

[76] Inventor: Vincent S. Pernicano, 2833 Railroad St., Boyne Falls, Mich. 49713

[21] Appl. No.: 553,564

[22] Filed: Nov. 21, 1983

[51] Int. Cl.[4] .................................... B32B 5/16

[52] U.S. Cl. .................................... 428/325; 428/241; 428/446; 428/429; 428/451; 156/230; 156/234

[58] Field of Search ............... 428/325, 241, 283, 446, 428/447, 429, 451; 156/230, 234

[56] References Cited

U.S. PATENT DOCUMENTS

| | | | |
|---|---|---|---|
| Re. 30,892 | 3/1982 | Bingham et al. | 428/446 X |
| 3,296,023 | 1/1967 | Leaderman et al. | 428/241 |
| 3,873,390 | 3/1975 | Cornell et al. | 428/446 |
| 3,956,552 | 5/1976 | Geary | 428/88 |
| 4,235,657 | 11/1980 | Greenman et al. | 156/234 |
| 4,248,500 | 2/1981 | Pernicano et al. | 350/98 |

*Primary Examiner*—Nancy A. B. Swisher

*Attorney, Agent, or Firm*—Reising, Ethington, Barnard, Perry & Milton

[57] ABSTRACT

A heat transfer sheeting combination of the type for being applied onto a fibrous material (10) to imprint a reflective design thereon, the combination including a sheet of substrate (12), the substrate (12) including a layer of fibrous material (20), a deformable layer (22), and an outer silicone layer (24). A layer of beads (14) is partially embedded in the silicone layer (24) and the deformable layer (22). A design layer (16) and an adhesive layer (18) are disposed over the substrate sheeting (12). A method of making the heat transfer sheeting combination includes the steps of passing the sheet of substrate (12) having the exposed silicone layer (24) through a mass of beads (14) to adhere a layer of beads (14) of the silicone layer (24) and fixedly securing the beads (14) to the sheet (12).

18 Claims, 1 Drawing Sheet

REFLECTIVE TRANSFER SHEETING AND METHOD OF MAKING THE SAME

TECHNICAL FIELD

The instant invention relates to a reflective transfer sheeting of the type including a reflective design coating disposed on a substrate and an adhesive outer layer wherein heat is applied to the substrate side of the sheeting combination to transfer the reflective design coating onto an article. The adhesive secures the reflective design coating to the article.

BACKGROUND ART

Reflective transfer sheetings are used to transfer a reflective design of decal onto an article, such as a garment. When the garment is worn in dim light on the dark, the transfer will glow when light is cast upon the garment. The garment will glow when exposed to the light eminating from the headlights of an oncoming vehicle. The reflective transfer also provides an aesthetic appearance to the garment. An example of a reflective transfer sheeting and method of manufacturing the same is disclosed in the U.S. Patents to the applicant, U.S. Pat. Nos. 4,248,500 issued Feb. 3, 1981 and 4,401,494 issued Aug. 30, 1983.

Various methods have been used to manufacture reflective transfer sheetings. The beads are usually spilled over a substrate and then coated with a binder material or the beads may be mixed with a binder material which is then cured to form a reflective layer. Such methods are disclosed in U.S. Patents to Goldman U.S. Pat. Nos. 3,405,025 issued Oct. 8, 1968 and Harper et al 4,102,562 issued July 25, 1978.

Transfer sheetings have been made using various substrates. In particular, the U.S. patent applications Ser. Nos. 430,835 filed Sept. 30, 1982 and 431,226 filed Sept. 30, 1982 to applicant disclose the use of a substrate having three layers. A first layer is made from a fibrous material. A middle layer is made from a deformable thermoplastic and the third layer is a release agent, such silicone.

Through various tests, applicant has discovered a novel feature of the release agent coat; that the substrate can be passed through a trough of beads and that the beads will adhere to the release agent coated surface. This step has been incorporated into the subject invention and has been developed to produce a novel transfer sheeting and method of making the same.

SUMMARY OF THE INVENTIONS

According to the present invention, there is provided a heat transfer sheeting combination of the type for being applied onto a fibrous material to imprint a reflective design thereon, the combination includes a substrate sheeting including a deformable layer and an outer silicone layer, the combination being characterized by including a layer of beads partially embedded in the silicone layer and the deformable layer. The present invention further provides a method of making the reflective heat transfer sheeting combination and includes the steps of passing a sheet of substrate having an exposed silicone layer through a mass of beads to adhere a layer of beads over the silicone layer and fixedly securing the beads to the sheeting.

FIGURES IN THE DRAWINGS

Other advantages of the present invention will be readily appreciated as the same become better understood by reference to the following detailed description when considered in connection with the accompanying drawings wherein.

DETAILED DESCRIPTION OF THE DRAWINGS

Figure 1:
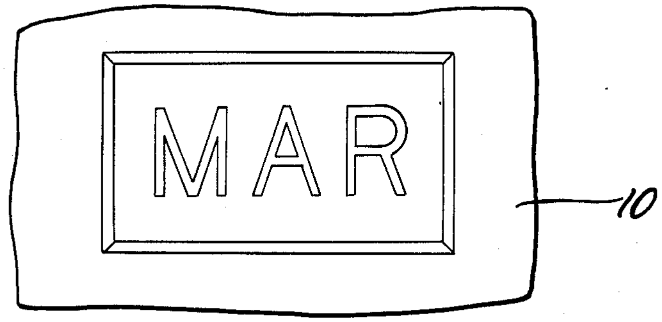
FIG. 1 is a heat transfer sheeting combination made in accordance with subject invention and applied to an article.

FIG. 1 shows a reflective heat transfer combination made in accordance with the subject invention applied to an article 10, such as fabric making up an article of clothing. The reflective heat transfer portion is defined by the letters MAR in the surrounding rectangular boarder.

Figure 2:
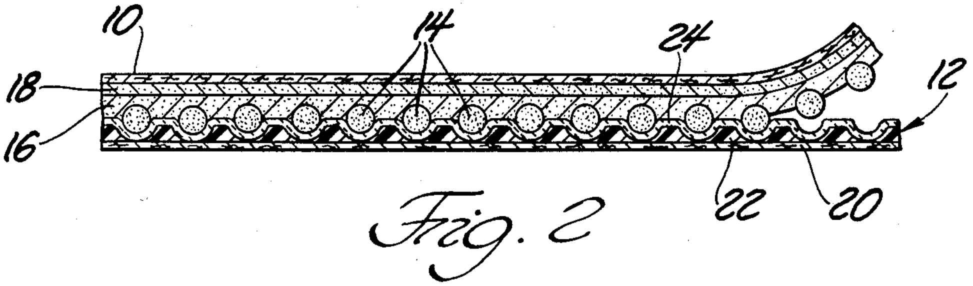
FIG. 2 is a fragmentary cross sectional view of the heat transfer sheeting of the subject invention shown being applied to an article.

The subject reflective heating transfer sheeting combination is shown in cross section in FIG. 2 in the configuration of the transfer as it is being applied to the article 10. The heat transfer sheeting includes a substrate generally indicated at 12. The combination further includes a reflective design coating disclosed on the substrate 12. The design layer comprises a plurality of reflective beads 14 disposed within a binder layer 16. Spherical glass beads commonly used in the art may be used. The binder layer may include an acrylic color ink 16 disposed over the reflective beads or particles 14. Various combinations of inks may be applied over the beads 14. Alternatively, a single acrylic color coat 16 may be used alone.

An adhesive layer 18 is disposed on the design coating 16 for adhesively securing the design coating 16 to the article 10. The adhesive layer 22 may include an adhesive that is responsive to heat and pressure to adhesively secure the colored coating to the article 10. A powdered adhesive may be used, the powdered adhesive comprising small particles of powder which are embedded into the binder layer 16. The powdered adhesive is thermo-setting plastic and preferably consists of polyester. Alternatively, a pressure sensitive adhesive may be used.

Figure 3:
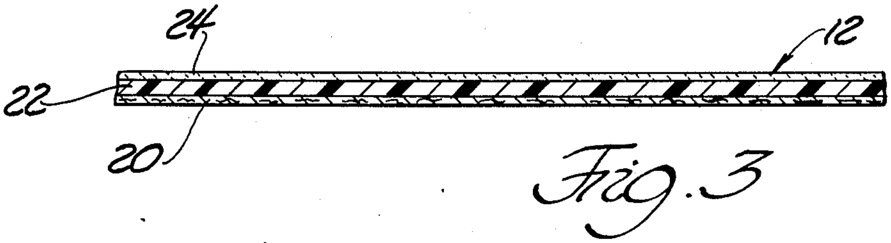
FIG. 3 is an enlarged fragmentary cross sectional view of the substrate of the instant invention.
Figure 4:
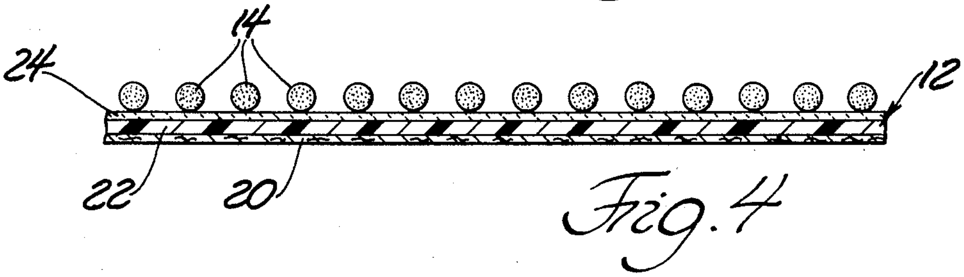
FIG. 4 is a fragmentary cross sectional view of the substrate of the instant invention after being passed through a mass of beads which are adhered to the silicone layer.
Figure 5:
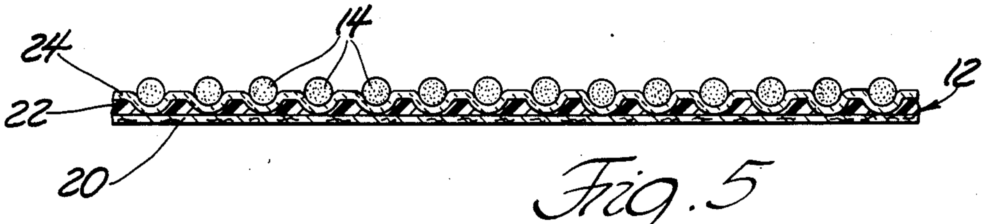
FIG. 5 is a fragmentary cross sectional view of the beads embedded in the silicone layer and the deformable layer of the substrate.

As shown in the enlarged cross sectional view in FIGS. 3 through 5, the substrate 12 includes a layer of fibrous material 20. The fibrous material 20 may be an absorbent layer. The substrate 12 further includes a layer of deformable material 22, such as a thermoplastic material. The thermoplastic material 22 may be polyethylene. A releasing agent coat 32, preferably silicone, is disposed over the polyethylene layer 22.

The subject invention is characterized by the beads 14 being partially embedded in the silicone layer 24 and the deformable layer 22. In other words, the instant invention provides a heat transfer sheeting combination of the type for being applied onto a fibrous material 10 to imprint a reflective design thereon, the combination including a substrate sheeting 12 including a deformable layer 22 and an outer silicone layer 24 and characterized by a layer of beads 14 partially embedded in the silicone layer 24 and the deformable layer 22. The deformable layer 22 includes a thermoplastic and preferably polyethylene. The adhesive layer 18 may be disposed over the binder layer 16 or directly over the beads 14. The adhesive layer 24 may cover a portion of the beads 14 in a predetermined pattern. A binder layer 16 disposed between the layer of beads 14 and the adhesive layer 18 may be disposed in that same predetermined pattern. In other words, the instant invention provides a transfer sheeting wherein the applied transfer includes coextensive layers acrylic ink and adhesive. The transfer sheeting includes beads 16 over its entire surface. However, the acrylic ink and adhesive may be applied in a predetermined pattern so that application of heat and pressure to the transfer to apply the transfer to the article 10 will only transfer those predetermined areas including adhesive, acrylic ink, and beads. A transfer applied from the subject heat transfer sheeting has beads uniformly distributed thereover in a smooth surface, unlike prior art transfers which had a rough surface and beads which were not uniformly distributed. Further, unlike prior art transfers wherein the ink disposed over the beads of the transfer were pushed around the beads so as to provide discolored portions, the instant invention provides a transfer wherein the ink layer 16 is smoothly disposed over the reflective beads. The polyethylene layer 12 prevents the ink 16 from being absorbed into the fibrous layer 20 of the sheeting material 12 thereby providing a consistent and smooth cover finish. The uniformity of the beads further provides increased reflectivity of the applied transfer.

The instant invention further provides a method of making the heat transfer sheeting combination of the type to be applied onto the fibrous article 10 to imprint the reflective design thereon. The method includes the steps of passing the substrate sheet 12 having the exposed silicone layer 24 thereon through a mass of beads 14 to adhere the layer of beads 14 on the silicone layer 24, as shown in FIG. 4. The beads 14 are then fixedly secured to the substrate sheeting 12. The beads 14 are secured to the sheeting 12 by partially embedding adhered beads 14 into the deformable layer 22 and the silicone layer 24 as shown in FIG. 5. This is accomplished by the application of a combination of heat and pressure for a predetermined period of time to the beads 14 to partially embed the beads in the silicone layer 24 and deformable layer 22. The extent of the embedding of the beads 14 into the silicone layer 24 and deformable layer 22 is controlled by the amount of time that the transfer is subjected to the applied heat and pressure.

The method further includes the step of applying an adhesive layer 24 over the beads 14. A layer of binders 16 may be established between the adhesive layer 18 and the layer of beads 14. The binder layer may include at least one acrylic ink.

The adhesive layer 18 may be established in a predetermined pattern over a portion of the bead layer 14. In other words, the substrate 12 may be passed through a trough of beads 14 so that the bead cover the entire surface of the substrate 12. The adhesive layer may be disposed over the beads in a predetermined pattern and the transfer applied to an article by placing the adhesive layer 18 of the transfer against the article 10 and applying heat and pressure to activate the adhesive to bond the portion of the bead layer 14 below the adhesive layer 18 to the article 10. When the paper sheeting 12 is removed from the article 10, the remainder of the bead layer is removed from the article 10 with the substrate 12. What remains on the article is the adhesive layer and the beads attached thereto. Alternatively, the adhesive layer 18 and the binder layer 16 may be applied in a predetermined pattern so that upon the application of heat and pressure the layer of beads, the layer of binder and the adhesive layer are applied to the article, the remainder of the beads being removed from the article with the removal of the substrate layer 12. Thusly, the applied beads 14 are within the area defined by the transferred design.

The invention has been described in an illustrative manner, and it is to be understood that the terminology which has been used is intended to be in the nature of words of description rather than of limitation.

Obviously many modifications and variations of the present invention are possible in light of the above teachings. It is therefore, to be understood that within the scope of the appended claims wherein reference numerals are merely for convenience and are not to be in any limiting, the invention may be practiced otherwise that is specifically described.

What is claimed is:

1. A method of making a heat transfer sheeting combination of the type for being applied onto a fibrous article (10) to imprint a reflective design thereon, said method including the steps of:

passing a sheet of substrate (12) having an exposed silicone layer (24) through a mass of beads (14) to adhere a layer of beads (14) over the silicone layer (24), and fixedly securing the beads (14) to the sheet (12).

2. A method as set forth in claim 1 wherein the sheeting includes a deformable layer (22) below the outer silicon layer, said step of fixedly securing the beads (14) to the sheet (12) further defined as partially embedding the adhered beads (14) into the deformable layer (22) and the silicone layer (24).

3. A method as set forth in claim 2 wherein the step of embedding the beads is further defined as applying a combination of heat and pressure for a predetermined period of time to the sheeting combination to partially embed the beads (14) in the silicone layer (24) and deformable layer (22).

4. A method as set forth in claim 3 wherein the deformable layer (22) is made from a thermoplastic.

5. A method as set forth in claim 4 wherein the thermoplastic is polyethylene.

6. A method as set forth in claim 2 further including the step of establishing an adhesive layer (18) over the layer of beads (14).

7. A method as set forth in claim 6 further including the step of establishing a layer of binder (16) between the adhesive layer (18) and the layer of beads (14).

8. A method as set forth in claim 7 wherein the binder layer includes at least one acrylic ink.

9. A method as set forth in claim 6 further defined by establishing the adhesive layer (18) in a predetermined pattern over a portion of the bead layer (14) and applying the transfer to an article (10) by placing the adhesive layer (18) of the transfer against the article (10) and applying heat and pressure to activate the adhesive (18) to bond the portion of the bead layer (14) below the adhesive layer (18) to the article (10) and removing the remainder of the bead layer from the article (10).

10. A method as set forth in claim 6 further defined by establishing the adhesive layer (18) and binder layer (16) in a predetermined pattern.

11. A heat transfer sheeting combination of the type for being applied onto a fibrous material (10) to imprint a reflective design thereon, said combination comprising;

a substrate sheeting (12) including a deformable layer (22), an outer silicone layer (24), and characterized by a layer of beads (14) partially embedded in said silicone layer (24) and said deformable layer (22).

12. A heat transfer as set forth in claim 11 further characterized by said deformable layer (22) including a thermoplastic.

13. A heat transfer as set forth in claim 12 further characterized by said thermoplastic being polyethylene.

14. A heat transfer as set forth in claim 11 further characterized by including an adhesive layer (24) over said layer of beads (14).

15. A heat transfer as set forth in claim 14 further characterized by including a layer of binder (16) between said adhesive layer (18) and said layer of beads (14)

16. A heat transfer as set forth in claim 15 further characterized by said binder layer (16) including at least one acrylic ink.

17. A heat transfer as set forth in claim 14 further characterized by said adhesive layer (24) covering a portion of said layer of beads (14) in a predetermined pattern.

18. A heat transfer as set forth in claim 17 further characterized by including a binder layer (16) between said layer of beads (14) and said adhesive layer (18) in said predetermined pattern.

* * * * *